United States Patent
Zhang et al.

[11] Patent Number: 5,198,147
[45] Date of Patent: Mar. 30, 1993

[54] CHEMICAL OXYGEN GENERATOR

[75] Inventors: Yunchang Zhang, Lenexa; James C. Cannon, Olathe, both of Kans.

[73] Assignee: Puritan-Bennett Corporation, Lenexa, Kans.

[21] Appl. No.: 683,276

[22] Filed: Apr. 10, 1991

[51] Int. Cl.$^5$ .................. C01B 11/14; C01B 11/18
[52] U.S. Cl. ................................. 252/187.31
[58] Field of Search ................. 252/187.31, 187.1

[56] References Cited

U.S. PATENT DOCUMENTS

| | | | |
|---|---|---|---|
| 3,089,855 | 5/1963 | Bovard | 252/187.1 X |
| 3,207,695 | 9/1965 | Gustafson | 252/187.1 X |
| 3,276,846 | 8/1962 | Moni et al. | 23/281 X |
| 3,293,187 | 12/1966 | Markowitz | 252/187.1 X |
| 3,573,001 | 3/1971 | Bovard | 23/281 X |
| 3,862,866 | 1/1975 | Timmerman et al. | 149/21 X |
| 4,073,741 | 2/1978 | Heintz | 252/187.1 X |
| 4,238,464 | 12/1980 | Gustafson | 423/230 X |
| 5,049,306 | 9/1991 | Greer | 252/187.31 X |

*Primary Examiner*—Richard D. Lovering
*Assistant Examiner*—Joseph D. Anthony
*Attorney, Agent, or Firm*—Hovey, Williams, Timmons & Collins

[57] ABSTRACT

An improved chemical oxygen generator (10) includes an oxygen generating candle (12) having an oxygen source, which upon decomposition will yield oxygen, and a nontoxic additive to smooth decomposition and suppress formation of toxic free chlorine gas. The nontoxic additive may be taken from the group consisting of: (1) the oxides, hydroxides and carbonates of calcium and the rare earth elements; (2) the hydroxides and carbonates of magnesium; and (3) mixtures of the foregoing. A complete chemical oxygen generator utilizes the candle (12) of the invention. The oxygen generator preferably includes a canister (14), oxygen-generating candle (12), and an ignition device (16). Triggering of the ignition device ignites an ignition pellet (52) which initiates decomposition of the candle body (50). Once initiated, the candle will sustain decomposition to release breathable oxygen until the candle is completely reacted.

13 Claims, 3 Drawing Sheets

CHEMICAL OXYGEN GENERATOR

BACKGROUND OF THE INVENTION

1. Field of the Invention

The present invention is broadly concerned with an improved oxygen generating candle having a nontoxic additive compound to smooth decomposition and suppress formation of toxic free chlorine gas. More particularly, it is concerned with a candle having an oxygen source, and having therein an additive taken from the group consisting of the oxides, hydroxides and carbonates of calcium and the rare earth elements, and the hydroxides and carbonates of magnesium, which upon decomposition will yield breathable oxygen.

2. Description of the Prior Art

Chemical oxygen candles based on the decomposition of alkali metal chlorates or perchlorates are used where an oxygen supply is needed in passenger airplanes, submarines, and other closed atmospheric conditions.

Previous oxygen candles have consisted of an alkali meta chlorate or perchlorate source which produces oxygen upon decomposition, and $BaO_2$ to smooth decomposition and suppress toxic free chlorine gas formation. A metal oxide catalyst is also commonly used to facilitate the decomposition, along with amounts of iron or other metal powder fuel to furnish extra heat necessary to help sustain the decomposition and glass powder or glass fiber as a binder.

Although $BaO_2$ has useful functions and has been used in oxygen candles for decades, it is a poisonous compound. Unless precautions are taken, tiny $BaO_2$ particles may contaminate the oxygen produced. Moreover, environmental regulations require costly special disposal of scraps and expended oxygen candles containing $BaO_2$. Various caustic alkali metal oxides such as $Li_2O_2$, $KO_2$, $Na_2O_2$, and $Na_2O$ have also been used to suppress acidic chlorine gas formation.

Markowitz, in *Industrial & Engineering Chemistry Product Research and Development*, Vol. 3, No. 4, page 321 at 324, (1964), discloses use of $Li_2O_2$ and $KO_2$ to suppress free chlorine formation in a lithium perchlorate oxygen candle. This reference points out that, consistent with the use of barium peroxide in the chlorate candle and in other pyrochemical oxygen source systems, it is the highly basic additives such as $Li_2O$, $Li_2O_2$, LiOH, $BaO_2$ which appreciably lower the amounts of chlorine stemming from the decomposing lithium perchlorate.

U.S. Pat. Nos. 3,702,305, and 3,736,104 disclose use of sodium oxide and peroxide catalysts in a sodium chlorate oxygen candle. However, these alkali metal oxides, as well as those disclosed by Markowitz, are air sensitive and caustic. They will adsorb moisture and $CO_2$ from the air, resulting in decomposition upon exposure to air, with concomitant problems for production use and storage. Candles using such compounds must be produced by a dry process, and production by wet pressing is precluded. In addition, such candles require costly special disposal when expended or scrapped because of the remaining caustic alkali metal oxides.

SUMMARY OF THE INVENTION

The present invention overcomes the problems noted above. and provides a greatly improved oxygen-generating composition which contains no $BaO_2$ or other toxic or caustic compound, which is reasonably stable in air and which can function well in a broad range of environmental temperatures.

Broadly speaking, the oxygen-generating candle includes an oxygen source which upon initiation and decomposition thereof will yield oxygen, and a nontoxic additive incorporated into the candle for suppression of residual chlorine gas formed through side reactions. The additive of the present invention preferably include: (1) the oxides, hydroxides, and carbonates of calcium and the rare earth elements; (2) the hydroxides and carbonates of magnesium; and (3) mixtures of the foregoing.

In particularly preferred forms the candle includes an alkali metal chlorate or perchlorate oxygen source, from about 0.05 to 10% by weight of calcium hydroxide additive, a metal oxide catalyst, a metal powder fuel and a binder or filler.

DESCRIPTION OF THE PREFERRED EMBODIMENT

Figure 1:
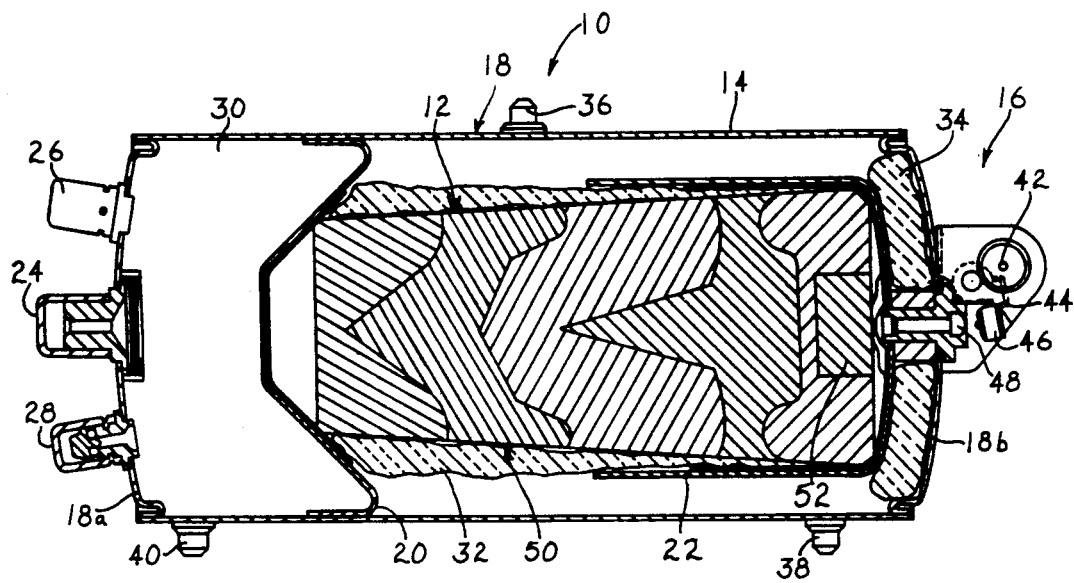
FIG. 1 is a cross sectional side view of a chemical oxygen generator in accordance with the invention.

Referring now to the drawings, a representative chemical oxygen generator 10 in accordance with the present invention is illustrated in FIG. 1 to include a candle 12, installed in a canister 14, with ignition means 16. Those skilled in the art will appreciate that the candle of the invention may be used in connection with any number of other oxygen generation devices.

Canister 14 includes tubular housing 18, closed by end caps 18a and 18b, interior core locator partition 20, spatter shield 22, outlet valve 24 and a pair of relief valves 26, 28 mounted on end cap 18a. Those skilled in the art will appreciate that the number and location of outlet and relief valves may vary with the overall size and intended use of the apparatus. Conventional filter material (not shown) occupies the space between core locator 20 and end cap 18a. Candle 12 is surrounded by thermal insulation 32, 34. Mounting lugs 36, 38, 40 are provided on the exterior of the canister surface.

Ignition means 16 includes pull pin 42, spring 44, hammer 46, and primer 48. Although a percussion type ignition means is preferred, any suitable form of ignition means may be employed.

Figure 2:
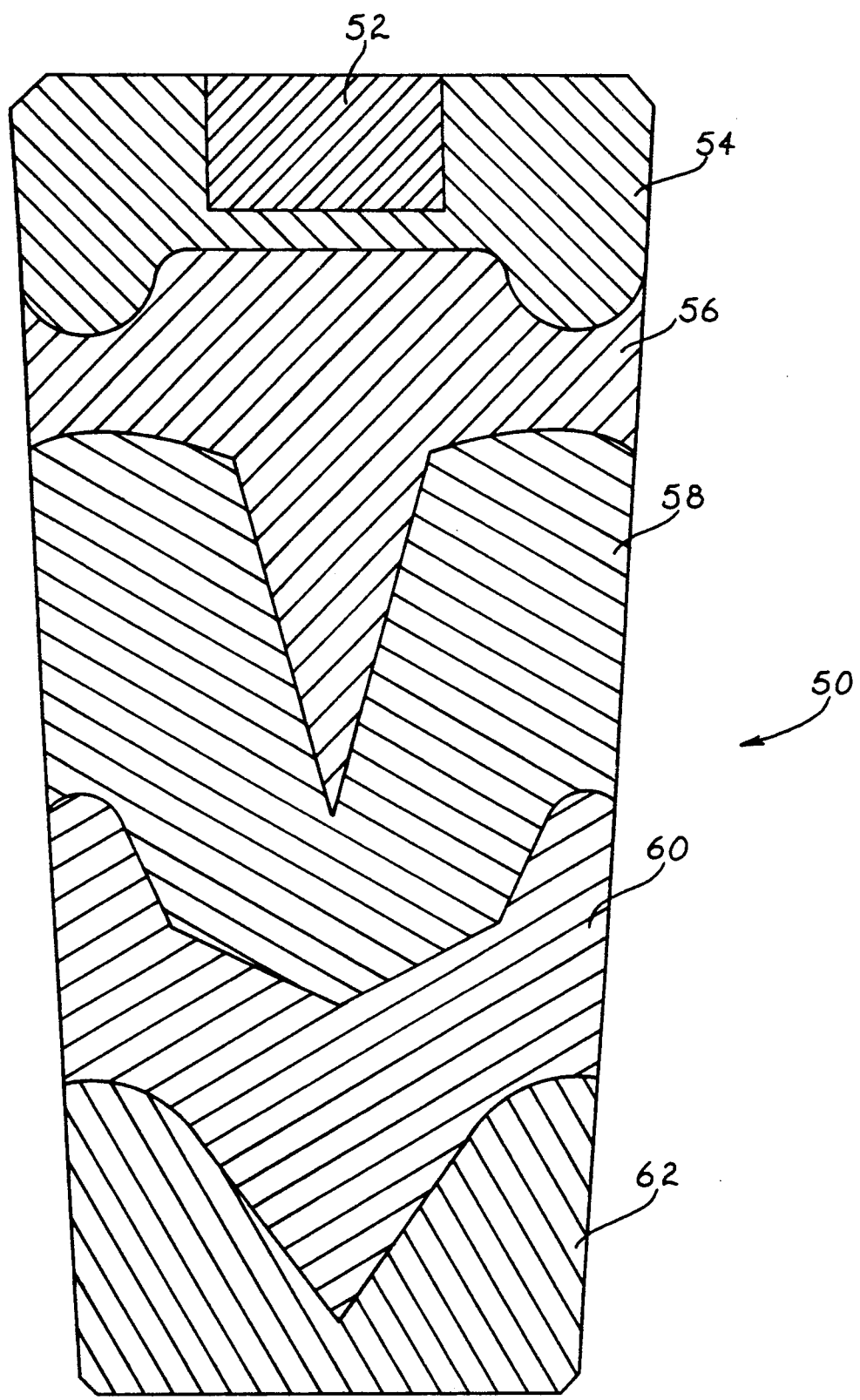
FIG. 2 is a cross sectional side view of a candle block in accordance with the invention.

Candle 12 broadly includes body 50 and ignition pellet 52. The preferred candle 12 has a weight of between 222 and 228 grams and is 5.0 inches long with a diameter of 1.4 inches at the ignition end and 1.1 inches at the outlet end. The preferred ignition pellet 52 has a diameter of 0.56 inch, is 0.25 inches thick and weighs 1.5 grams. Body 50 consists of an oxygen source and a nontoxic additive compound incorporated into the candle. Candle 12 may be formulated to further include a catalyst, a metal powder fuel, and a binder or filler. In order to achieve various high altitude descent oxygen flow specifications, the candle 12 may be constructed of multiple layers of varying chemical composition. As shown in FIG. 2, the candle may include a first composition layer 54 in contact with ignition pellet 52, and second composition layer 56 and layers thereafter including a nontoxic additive as previously described herein. In other embodiments, the first composition layer 54 may also contain the nontoxic additive. The preferred candle includes additional layers 58, 60, 62, although any number of layers may be used.

In operation, a user engages pull pin 42 either directly or by means of a cord or other similar remote activation mechanism. When pin 42 is pulled, spring 44 is actuated, causing hammer 46 to hit primer 48 and ignite it. Primer 48 ignites ignition pellet 52 loaded at the top of the candle body 50. The heat generated from ignition pellet 52 then initiates decompostion of the candle body. Once initiated, the candle will sustain an exothermic decomposition reaction at a uniform rate to release oxygen at a stable flow rate until the chemical core has completely reacted.

The gaseous reaction products pass through filter material 30 to remove solid particles and any residual chlorine and carbon monoxide and thence through outlet valve 24 which may be connected to a gas manifold or other oxygen delivery means. In the event of blockage of outlet valve 24 or other increased pressure inside canister, relief valves 26, 28 allow gases to escape. The generated oxygen which passes through outlet valve 24 has the high purity required for breathing. In preferred embodiments the chlorine level is lower than 50 ppb, carbon monoxide level is lower than 3 ppm and carbon dioxide is lower than 1500 ppm. The candle operates well over wide environmental temperatures.

Alkali metal chlorates or perchlorates such as $KClO_3$, $KClO_4$, $NaClO_4$, $NaClO_3$, $LiClO_3$, and $LiClO_4$ or mixtures thereof can be used as oxygen generating sources. The preferred chlorate is sodium chlorate and the preferred perchlorate is potassium perchlorate.

Sodium chlorate is a particularly preferred oxygen source because it has a relatively high oxygen yield per unit weight compared to potassium chlorate and a reasonably low decomposition temperature compared to potassium chlorate, potassium perchlorate and lithium perchlorate. Decomposition of sodium chlorate is exothermic once initiated, which is essential for self-sustaining operation of the candle. The cost of sodium chlorate is also less than other alkali metal chlorates and perchlorates.

The oxides, hydroxides, and carbonates of calcium and the rare earth elements, the hydroxides and carbonates of magnesium and mixtures of the foregoing may be employed as additives to smooth chlorate decomposition and suppress free chlorine formation. Calcium hydroxide is a particularly preferred additive because it is nontoxic and much less corrosive than other alkali metal oxides and hydroxides or the barium oxides and hydroxides. Calcium hydroxide is used safely in plaster, mortar, cement and other building and paving materials as well as in water treatment, water paints and egg preservation. Particularly advantageously for aircraft applications, $Ca(OH)_2$ has a much lower molecular weight than $BaO_2$ as used in previous oxygen generating candles. Substitution of an equimolar amount of $Ca(OH)_2$ for $BaO_2$ results in a reduction in the candle weight. Calcium hydroxide is readily available, inexpensive and in powder form which does not cake and mixes readily. Substitution of calcium hydroxide for barium peroxide in known oxygen-generating candles results in uniform mixing of the ingredients in a shorter time.

In addition, $Ca(OH)_2$ decomposes endothermically at around 500° according to the following equation:

$$Ca(OH)_2 \rightarrow CaO + H_2O$$

Decomposition of one mole of calcium hydroxide can absorb 109 kj heat and act as a heat sink. Thus, use of calcium hydroxide as an additive makes it possible to produce highly catalyzed, cooler oxygen generators. Such cooler generators are easier to handle and are especially useful in circumstances where high temperature oxygen generators are not manageable, such as high altitude parachute applications.

Oxygen generators to be used in an aircraft should function well in a broad range of environmental temperatures of from about −30° to about 60° C. Since candles containing calcium hydroxide do not burn substantially faster at higher surrounding temperatures, a much smaller candle weight may be used to supply oxygen for a required duration over a wide range of temperatures. While the precise chemical reaction is not known, calcium hydroxide is basic and should react with acidic chlorine gas to form $CaCl_2$ at the elevated temperatures developed in the operating candles.

The preferred candle composition includes about 0.05 to 10% by weight of calcium hydroxide, with about 0.2 to 2.0% by weight being particularly preferred. $Ca(OH)_2$ may be obtained from Aldrich Chemical Company or Fisher Scientific. $Ca(OH)_2$ having a suitably small particle size may be obtained from other commercial sources as well. Other compounds can also be used to smooth oxygen generation and suppress chlorine formation. $Mg(OH)_2$ can be used, although it is less effective. Calcium carbonate is effective to some extent, but undesirable additional $CO_2$ is introduced in the process. SrO and $Sr(OH)_2$ can also be used but they are not preferred because they are caustic.

Calcium hydroxide is known to slowly adsorb $CO_2$ and moisture when exposed to air. Therefore, an adsorption experiment was conducted in which 400 mg calcium hydroxide powder was exposed to air. The weight increased 4% over 18 hours. Based on this result, it is expected that adsorption of $CO_2$ and water by calcium hydroxide in a candle body 50 would be minimal since, compared to the powdered calcium hydroxide of the experiment, the candle body has a much smaller surface area exposed to air. In addition, the process of fabricating an oxygen-generating candle will be much shorter in duration than the 18 hour experimental period. Any such adsorbed water would be removed during drying of the candle.

Preferred catalysts include the cobalt oxides, such as CoO, $Co_3O_4$, $Co_2O_3$, $CoO_x$, where x equals 1.0 to 1.5, and mixtures thereof.

Cobalt oxide is particularly preferred as it can lower the decomposition temperature of sodium chlorate from 450° C. to approximately 230° C. It may be obtained by decomposing cobalt carbonate or cobalt hydroxide. For example, cobalt carbonate may be decomposed at 260° C. for 24 hours to produce a cobalt oxide with a specific surface area of approximately 100 m²/g.

Preferred metal powder fuels include iron, manganese, cobalt, nickel, tungsten, titanium, magnesium, aluminum, niobium, zirconium, and mixtures thereof.

Iron powder having high purity and high surface area is particularly preferred. It may be obtained electrolytically or by hydrogen reduction to yield iron powder substantially free of carbon and other impurities which would produce toxic compounds upon operation of the candle. Use of iron powder in the oxygen-generating candle furnishes heat and assists in stabilizing chlorate decomposition. Candles containing iron are less sensitive to surrounding temperatures than catalyzed fuel free candles previously described.

Preferred binders include glass powder, glass fiber, ceramic fiber, steel wool, and mixtures thereof.

In particularly preferred forms, the candle 12 has the following composition:

| Ignition pellet | |
| --- | --- |
| Fe | 15% |
| $Fe_2O_3$ | 10% |
| $Co_2O_3$ | 15% |
| glass powder | 5% |
| $NaClO_3$ | 55% |
| First layer 54 | |
| Fe | 12% |
| Cobalt oxide | 9% |
| glass powder | 5% |
| $Ca(OH)_2$ | 0–1% |
| $NaClO_3$ | 73–74% |
| Second layer 56, and additional layers 58, 60, 62 | |
| $Ca(OH)_2$ | 0.1–3.0% |
| Fe | 0–8% |
| cobalt oxide | 0.3–2.0% |
| $KClO_4$ | 0–7% |
| glass powder | 0–3% |
| $NaClO_3$ | 85–96% |

The constituents of each layer are mixed with 1 to 3 percent by weight water until uniform dispersion of the components is achieved. Mixing may be carried out manually or by means of a mechanical mixer such as a ball mill. A preferred mixing sequence is to combine water and sodium chlorate to wet the sodium chlorate surface uniformly so that the catalyst and fuel can stick onto the surface. The water is also useful in pressing of the candle. The calcium hydroxide, cobalt oxide, iron, glass powder and $KClO_4$, if any, are mixed separately. The two mixtures are then combined and mixed until uniformity is achieved. The mixed chemicals for each layer are then poured layer by layer into a steel cavity mold. 8 to 12 tons of pressure is then applied to mold the candle. The candle is then dried at 120° C. for 18 hours to vaporize all water added and any moisture adsorbed. Any water remaining in the candle would result in higher chlorine production and would react slowly with the iron powder to effect changes in the performance of the generator.

A specially formed interface can be used to assist in smooth transition from one candle layer to the next. After each mixture is poured into the mold, it may be tapped firmly with a cone shaped hammer. The shape of the hammer can be modified to satisfy transition requirements for different applications. The oxygen generating rate is proportional to the cross-sectional area of the candle and thus to the diameter of the candle. The duration of the oxygen flow from the generator is proportional to the length of the candle. Therefore, the oxygen generating rate and the duration of the output for a given weight candle can be controlled to some extent by changing the geometry of the candle.

The following examples describe preferred embodiments of the invention, although the invention is not limited to these embodiments.

EXAMPLE I

1st layer: 10.6 grams. 74% $NaClO_3$, 12% Fe, 9.0% $CoO_x$, and 5.0% glass powder.
2nd layer: 38.2 grams. 87.1% $NaClO_3$, 7.5% Fe, 0.5% $Ca(OH)_2$, 1.7% $CoO_x$, and 3.2% glass powder.
3rd layer: 56.8 grams. 89.6% $NaClO_3$, 6.0% Fe, 0.5% $Ca(OH)_2$, 0.9% $CoO_x$, and 3.0% glass powder.
4th layer: 85.7 grams. 94.3% $NaClO_3$, 2.8% Fe, 0.5% $Ca(OH)_2$, 0.4% $CoO_x$, and 2.0% glass powder.
5th layer: 34.5 grams. 95.9% $NaClO_3$, 1.2% Fe, 0.5% $Ca(OH)_2$, 0.4% $CoO_x$, and 2.0% glass powder.

Figure 3:
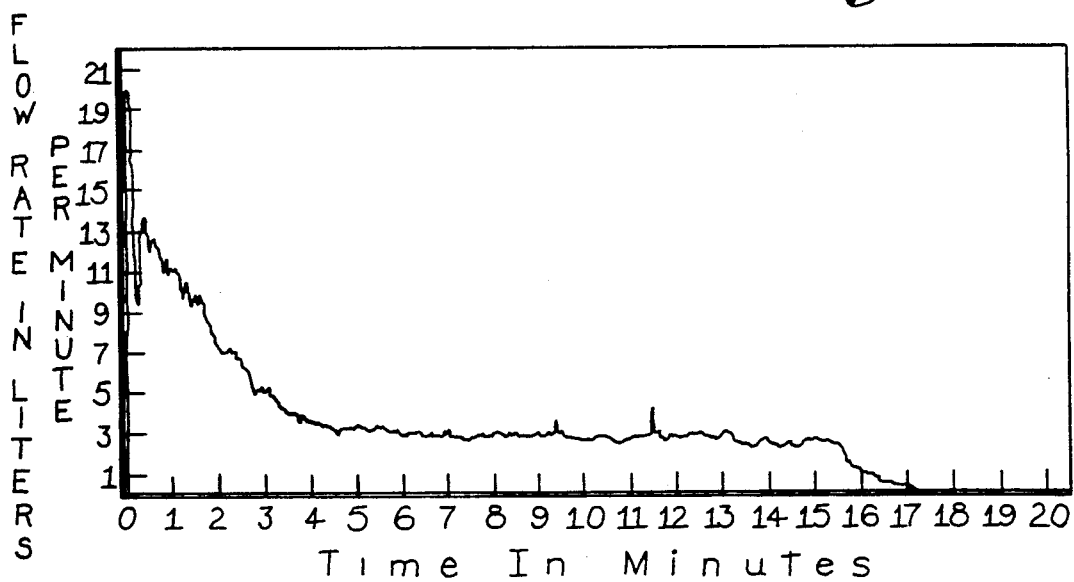
FIG. 3 is a graph showing oxygen release over time for the candle described in Example I.

The candle lasted for 17.3 minutes with an oxygen release of 66.2 liters at room temperature. The oxygen flow rate over time is shown in FIG. 3.

EXAMPLE II

1st layer: 10.6 grams. 74% $NaClO_3$, 12% Fe, 9.0% $CoO_x$, and 5.0% glass powder.
2nd layer: 38.2 grams. 88.6% $NaClO_3$, 6.0% Fe, 1.0% $Ca(OH)_2$, 1.2% $CoO_x$, and 3.2% glass powder.
3rd layer: 56.8 grams. 90.3% $NaClO_3$, 5.0% Fe, 1.0% $Ca(OH)_2$, 0.7% $CoO_x$, and 3.0% glass powder.
4th layer: 118.2 grams. 91.9% $NaClO_3$, 2.7% Fe, 1.0% $Ca(OH)_2$, 0.4% $CoO_x$, 2.0% $KClO_4$, and 2.0% glass powder.

The candle lasted for 18.5 minutes with an oxygen release of 66.6 liters at room temperature.

EXAMPLE III

1st layer: 10.6 grams. 74% $NaClO_3$, 12% Fe, 9.0% $CoO_x$, and 5.0% glass powder.
2nd layer: 34.2 grams. 86.0% $NaClO_3$, 8.0% Fe, 1.0% $Ca(OH)_2$, 1.8% $CoO_x$, and 3.2% glass powder.
3rd layer: 58.8 grams. 88.6% $NaClO_3$, 6.5% Fe, 1.0% $Ca(OH)_2$, 0.9% $CoO_x$, and 3.0% glass powder.
4th layer: 84.7 grams. 93.2% $NaClO_3$, 3.4% Fe, 1.0% $Ca(OH)_2$, 0.4% $CoO_x$, and 2.0% glass powder.
5th layer: 37.4 grams. 95.2% $NaClO_3$, 1.4% Fe, 1.0% $Ca(OH)_2$, 0.4% $CoO_x$, and 2.0% glass powder.

Figure 4:
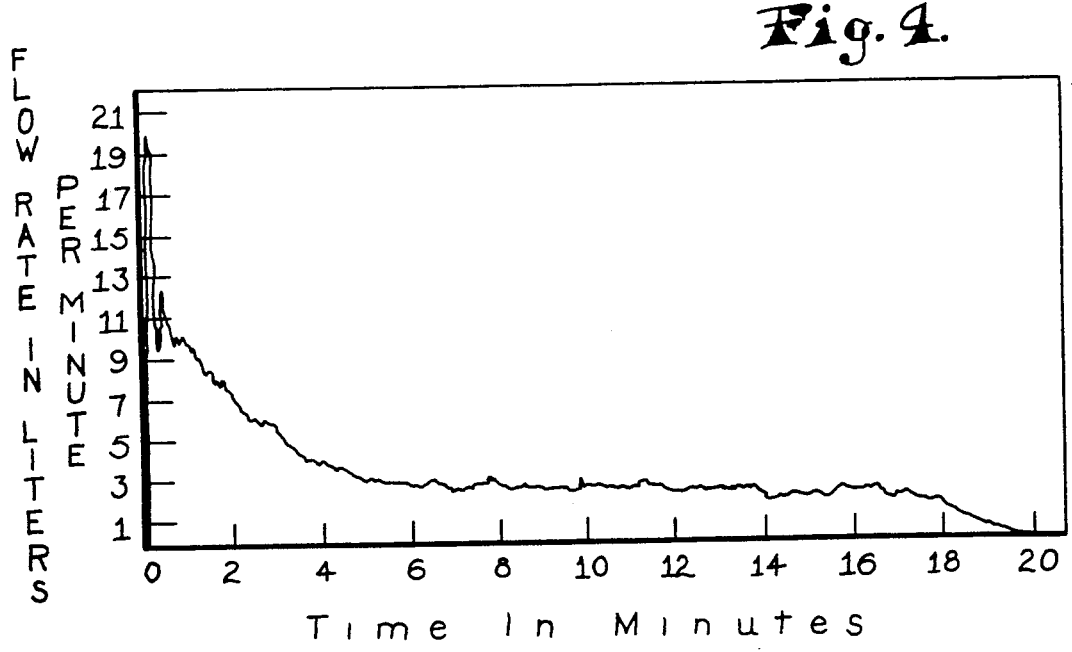
FIG. 4 is graph showing oxygen release over time for the candle described in Example III.

The candle lasted for 19.6 minutes with an oxygen release of 66.3 liters at room temperature. The oxygen flow rate over time is shown in FIG. 4.

EXAMPLE IV

1st layer: 10.6 grams. 74% $NaClO_3$, 12% Fe, 9.0% $CoO_x$, and 5.0% glass powder.
2nd layer: 38.2 grams. 88.6% $NaClO_3$, 6.5% Fe, 0.5% $Ca(OH)_2$, 1.2% $CoO_x$, and 3.2% glass powder.
3rd layer: 56.8 grams. 89.8% $NaClO_3$, 5.5% Fe, 1.0% $Ca(OH)_2$, 0.7% $CoO_x$, and 3.0% glass powder.
4th layer: 118.2 grams. 93.9% $NaClO_3$, 2.7% Fe, 1.0% $Ca(OH)_2$, 0.4% $CoO_x$, and 2.0% glass powder.

Figure 5:
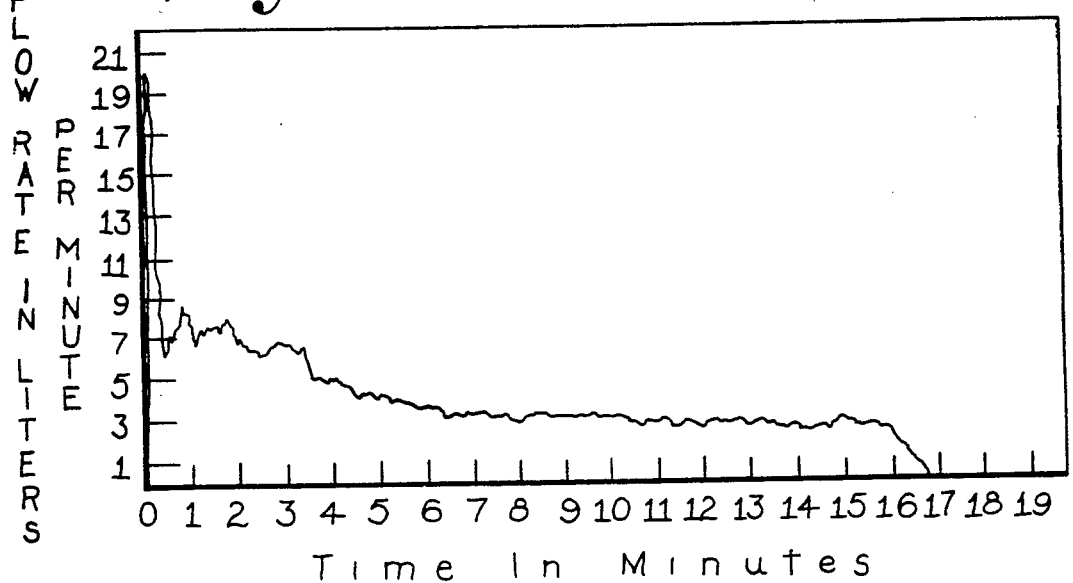
FIG. 5 is a graph showing oxygen release over time for the candle described in Example IV.

The candle lasted for 16.7 minutes with an oxygen release of 67.0 liters at room temperature. The oxygen flow rate over time is shown in FIG. 5.

EXAMPLE V

1st layer: 10.6 grams. 74% $NaClO_3$, 12% Fe, 9.0% $CoO_x$, and 5.0% glass powder.
2nd layer: 38.2 grams. 86.5% $NaClO_3$, 7.0% Fe, 2.0% $Ca(OH)_2$, 1.3% $CoO_x$, and 3.2% glass powder.
3rd layer: 55.9 grams. 88.8% $NaClO_3$, 5.5% Fe, 2.0% $Ca(OH)_2$, 0.7% $CoO_x$, and 3.0% glass powder.
4th layer: 84.7 grams. 90.1% $NaClO_3$, 3.5% Fe, 2.0% $Ca(OH)_2$, 2.0% $KClO_4$, 0.4% $CoO_x$, and 2.0% glass powder.

5th layer: 33.5 grams. 91.1% NaClO$_3$, 1.5% Fe, 2.0% Ca(OH)$_2$, 3.0% KClO$_4$, 0.4% CoO$_x$, and 2.0% glass powder.

The candle lasted for 17.8 minutes with an oxygen release of 62.3 liters at room temperature.

EXAMPLE VI

1st layer: 10.6 grams. 74% NaClO$_3$, 12% Fe, 9.0% CoO$_x$, and 5.0% glass powder.
2nd layer: 38.2 grams. 86.4% NaClO$_3$, 7.0% Fe, 2.0% Ca(OH)$_2$, 1.4 CoO$_x$, and 3.2% glass powder.
3rd layer: 56.8 grams. 88.2% NaClO$_3$, 6.0% Fe, 2.0% Ca(OH)$_2$, 0.8% CoO$_x$, and 3.0% glass powder.
4th layer: 84.7 grams. 92.1% NaClO$_3$, 3.5% Fe, 2.0% Ca(OH)$_2$, 0.4% CoO$_x$, and 2.0% glass powder.
5th layer: 33.5 grams. 93.6% NaClO$_3$, 2.0% Fe, 2.0% Ca(OH)$_2$, 0.4% CoO$_x$, and 2.0% glass powder.

The candle lasted for 18.1 minutes with an oxygen release of 65.7 liters at room temperature.

EXAMPLE VII

1st layer: 10.6 grams. 74.0% NaClO$_3$, 12.0% Fe, 9.0% CoO$_x$, and 5.0% glass powder.
2nd layer: 38.2 grams. 85.4% NaClO$_3$, 7.0% Fe, 3.0% Ca(OH)$_2$, 1.4% CoO$_x$, and 3.2% glass powder.
3rd layer: 55.7 grams. 87.7% NaClO$_3$, 5.5% Fe, 3.0% Ca(OH)$_2$, 0.8% CoO$_x$, and 3.0% glass powder.
4th layer: 84.7 grams. 89.1% NaClO$_3$, 3.5% Fe, 3.0% Ca(OH)$_2$, 2.0% KClO$_4$, 0.4% CoO$_x$, and 2.0% glass powder.
5th layer: 33.5 grams. 89.8% NaClO$_3$, 1.8% Fe, 3.0% Ca(OH)$_2$, 3.0% KClO$_4$, 0.4% CoO$_x$, and 2.0% glass powder.

The candle lasted for 19.8 minutes with an oxygen release of 63.5 liters at room temperature.

EXAMPLE VIII

1st layer: 10.6 grams. 73.5% NaClO$_3$, 0.5% Ca(OH)$_2$, 12% Fe, 9.0% CoO$_x$, and 5.0% glass powder.
2nd layer: 38.2 grams. 88.1% NaClO$_3$, 7.0% Fe, 0.5% Ca(OH)$_2$, 1.4% CoO$_x$, and 3.0% glass powder.
3rd layer: 56.0 grams. 89.3% NaClO$_3$, 6.5% Fe, 0.5% Ca(OH)$_2$, 0.7% CoO$_x$, and 3.0% glass powder.
4th layer: 85.7 grams. 94.0% NaClO$_3$, 3.1% Fe, 0.5% Ca(OH)$_2$, 0.4% CoO$_x$, and 2.0% glass powder.
5th layer: 34.5 grams. 96.0% NaClO$_3$, 1.2% Fe, 0.5% Ca(OH)$_2$, 0.3% CoO$_x$, and 2.0% glass powder.

The candle lasted for 19.2 minutes with an oxygen release of 64.8 liters at room temperature.

EXAMPLE IX

1st layer: 10.6 grams. 74.0% NaClO$_3$, 12.0% Fe, 9.0% CoO$_x$, and 5.0% glass powder.
2nd layer: 38.2 grams. 88.8% NaClO$_3$, 6.5% Fe, 0.2% Ca(OH)$_2$, 1.5% CoO$_x$, and 3.0% glass powder.
3rd layer: 56.8 grams. 90.5% NaClO$_3$, 5.5% Fe, 0.2% Ca(OH)$_2$, 0.8% CoO$_x$, and 3.0% glass powder.
4th layer: 85.7 grams. 94.6% NaClO$_3$, 2.8% Fe, 0.2% Ca(OH)$_2$, 0.4% CoO$_x$, and 2.0% glass powder.
5th layer: 34.5 grams. 96.3% NaClO$_3$, 1.2% Fe, 0.2% Ca(OH)$_2$, 0.3% CoO$_x$, and 2.0% glass powder.

The candle lasted for 14.8 minutes with an oxygen release of 64.4 liters at room temperature.

The preferred candle includes from about 70 to 99% by weight of an alkali metal chlorate or perchlorate oxygen source, and from about 0.05 to 10% by weight of an additive such as calcium hydroxide, with about 0.2 to 2.0% by weight being particularly preferred, as can be seen from the previous examples. In addition, the preferred candle includes from about 0.1 to 10% by weight of a metal oxide catalyst, and from about 0.5 to 15% by weight of a metal powder fuel. From about 0.5 to 5% by weight of a binder or filler may also be employed in preferred embodiments.

We claim:

1. In an oxygen-generating candle for producing a breathable gas and including therein an amount of an oxygen source which upon ignition and decomposition thereof will yield oxygen and residual chlorine, the improvement which comprises from about 0.5-15% by weight of a metal powder fuel, from about 20-99% by weight of an oxygen source selected from the group consisting of sodium chlorate, potassium chlorate, lithium chlorate, sodium perchlorate, potassium perchlorate and lithium perchlorate and from about 0.05-10% by weight of a nontoxic additive incorporated into said candle for suppression of said residual chlorine and smoothing the decomposition of said candle, said additive being selected from the group consisting of: (1) the oxides, hydroxides and carbonates of calcium and the rare earth elements; (2) the hydroxides and carbonates of magnesium; and (3) mixtures of the foregoing, said additive being in intimate admixture with said fuel and oxygen source for suppressing the formation of free chlorine and smoothing the decomposition of said candle upon said ignition thereof, said candle being operable for producing said breathable gas over a period of several minutes.

2. The oxygen-generating candle of claim 1, said additive comprising calcium hydroxide.

3. The oxygen-generating candle of claim 1, said additive comprising from about 0.05 to 10% by weight of calcium hydroxide.

4. The oxygen-generating candle of claim 3, said calcium hydroxide being present at a level of from about 0.2 to 2.0% by weight.

5. The oxygen-generating candle of claim 1, said oxygen source being sodium chlorate.

6. The oxygen-generating candle of claim 1, said oxygen source being potassium perchlorate.

7. The oxygen-generating candle of claim 1, further including a catalyst, and a binder.

8. The oxygen-generating candle of claim 7, said catalyst comprising a cobalt oxide.

9. The oxygen-generating candle of claim 7, said binder selected from the group consisting of glass powder, glass fiber, ceramic fiber, steel wool, and mixtures thereof.

10. The oxygen-generating candle of claim 8, said cobalt oxide selected from the group consisting of CoO, Co$_3$O$_4$, Co$_2$O$_3$, and CoO$_x$ wherein x ranges from about 1.0 to 1.5, and mixtures thereof.

11. The oxygen-generating candle of claim 1, said metal powder fuel being selected from the group consisting of iron, manganese, cobalt, nickel, tungsten, titanium, magnesium, aluminum, niobium, zirconium and mixtures thereof.

12. The oxygen-generating candle of claim 11, said metal powder fuel being iron powder having high purity and high surface area.

13. The oxygen-generating candle of claim 1, said candle further including ignition means, wherein said candle is further comprised of a first composition layer in contact with said ignition means and at least one additional composition layer, said additive being incorporated into said additional layer.

* * * * *